No. 688,138. Patented Dec. 3, 1901.
H. THEMEL.
JOURNAL AND BEARING THEREFOR.
(Application filed June 8, 1901.)
(No Model.)

WITNESSES:

INVENTOR
Herman Themel
BY
ATTORNEYS

THE NORRIS PETERS CO., PHOTO-LITHO., WASHINGTON, D. C.

UNITED STATES PATENT OFFICE.

HERMAN THEMEL, OF ESCANABA, MICHIGAN.

JOURNAL AND BEARING THEREFOR.

SPECIFICATION forming part of Letters Patent No. 688,138, dated December 3, 1901.

Application filed June 8, 1901. Serial No. 63,714. (No model.)

*To all whom it may concern:*

Be it known that I, HERMAN THEMEL, a citizen of the United States, and a resident of Escanaba, in the county of Delta and State of Michigan, have invented a new and Improved Journal and Bearing Therefor, of which the following is a full, clear, and exact description.

The object of the invention is to provide a new and improved journal and bearing therefor which is simple and durable in construction, very effective in operation, and arranged to require comparatively little lubrication without danger of becoming overheated.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1:
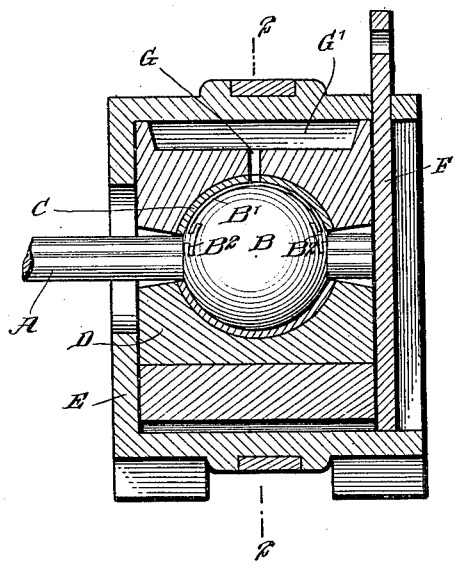
Figure 2:
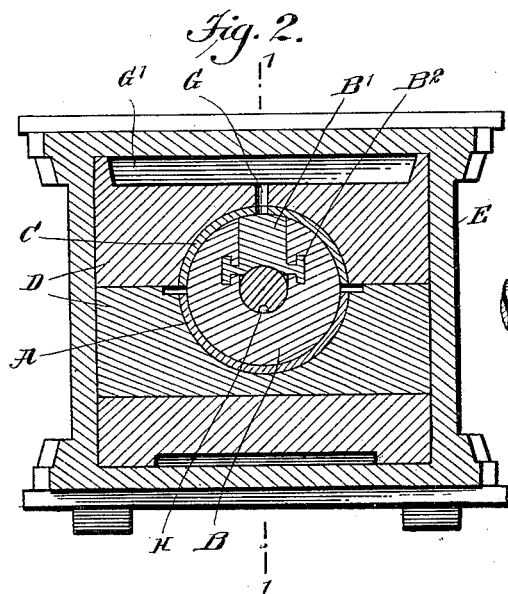

Figure 1 is a cross-section of the improvement as applied to a car-axle and box, the section being on the line 1 1 in Fig. 2, the ball and shaft being shown in elevation. Fig. 2 is a sectional side elevation of the same on the line 2 2 in Fig. 1, and Fig. 3 is a central sectional elevation of the improvement as applied to a line-shaft.

As illustrated in Figs. 1 and 2, a car-axle A is provided at each end with a ball B, seated in a correspondingly-shaped lining C, preferably made in two parts and held in a sectional bearing D, contained in a journal-box E of suitable construction, the bearing D abutting at its inner end against the inner wall of said box and at its outer end against a removable door F, preferably mounted to slide in bearings in the box. Oil-holes G extend through the bearing D and the lining C to the peripheral surface of the ball, so as to lubricate the same, the oil-holes being connected with a reservoir G', arranged in the top of the bearing D and containing the necessary lubricant. The ball B is removably held on the axle A, and for this purpose the ball is provided with a removable section B', of a width corresponding approximately to the diameter of the axle A, so that when the section B' is removed the ball can be readily slipped upon the axle from the side. The removable section B' of the ball is formed on its sides with dovetails $B^2$, engaging correspondingly-shaped grooves in the ball proper, so as to hold the section against outward movement in the ball.

In order to secure the ball in position on the axle A, a lug H is provided, preferably held on the ball and extending into an opening or recess formed in the axle A, as is plainly indicated in Fig. 2. By this arrangement longitudinal movement of the ball on the axle is prevented. The axle A extends through somewhat-enlarged openings in the bearing D, so that the surface of the ball B is held only in contact with the bearing, and by the use of this ball on the axle any undue jarring or jolting does not affect the proper running and a consequent increase of undue friction, so that comparatively very little lubricant is required to keep the journal and its bearings at all times in proper condition without danger of becoming overheated.

Figure 3:
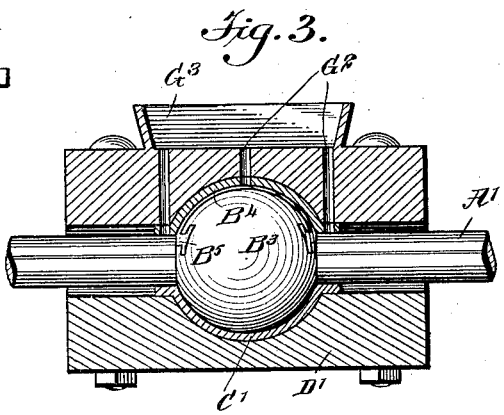

As illustrated in Fig. 3, a shaft A' is provided with a ball $B^3$, having a removable section $B^4$ with dovetails $B^5$, and said ball is mounted to turn in a lining C' of a bearing D', having the usual oil-holes $G^2$ and reservoir $G^3$ for supplying the necessary lubricant to the contact-surfaces of the ball $B^3$ and the lining C'. The shaft A' extends loosely in the bearing D', so that the ball takes up all strain.

Having thus fully described my invention, I claim as new and desire to secure by Letters Patent—

1. A journal, comprising a shaft, a ball mutilated for the purpose of admitting the shaft into the same, and a member fitting into the mutilation thus formed for the purpose of restoring the rotundity of said ball.

2. A journal, comprising a shaft, a ball fitted to said shaft and mutilated by the removal of a dovetailed section, and a separate section provided with dovetail tongues for slidably engaging within the mutilation thus formed.

3. A journal, comprising a shaft, a ball mutilated by the removal of a section as thick as the diameter of the shaft, for the purpose of admitting said shaft into said ball, and means for filling the mutilation thus formed so as to restore the rotundity of the ball.

4. A journal, comprising a shaft, a ball mutilated by the removal of a section as thick as the diameter of the shaft, for the purpose of admitting said shaft into said ball, means for filling the mutilation thus formed so as to restore the rotundity of the ball, and means for rigidly anchoring said ball and said shaft together.

5. A combined journal and bearing therefor, comprising a shaft, a ball mutilated for admitting the shaft into the same, a member fitting into the mutilation thus formed for the purpose of restoring the rotundity of the ball and a bearing consisting of upper and lower hemispherical members.

In testimony whereof I have signed my name to this specification in the presence of two subscribing witnesses.

HERMAN THEMEL.

Witnesses:
JOHN SEMER,
J. F. CAREY.